US010197275B2

(12) United States Patent
Kim et al.

(10) Patent No.: US 10,197,275 B2
(45) Date of Patent: Feb. 5, 2019

(54) HIGH FREQUENCY ACOUSTIC DAMPER FOR COMBUSTOR LINERS

(71) Applicant: General Electric Company, Schenectady, NY (US)

(72) Inventors: Kwanwoo Kim, Montgomery, OH (US); Changjin Yoon, Schenectady, NY (US); John Thomas Herbon, Loveland, OH (US)

(73) Assignee: General Electric Company, Schenectady, NY (US)

(*) Notice: Subject to any disclaimer, the term of this patent is extended or adjusted under 35 U.S.C. 154(b) by 450 days.

(21) Appl. No.: 15/145,175

(22) Filed: May 3, 2016

(65) Prior Publication Data

US 2017/0321895 A1 Nov. 9, 2017

(51) Int. Cl.

| | |
|---|---|
| ***F02C 9/46*** | (2006.01) |
| ***F23M 20/00*** | (2014.01) |
| ***F23R 3/00*** | (2006.01) |

(52) U.S. Cl.

CPC ........... *F23M 20/005* (2015.01); *F23R 3/002* (2013.01); *F05D 2260/963* (2013.01); *F23R 2900/00014* (2013.01)

(58) Field of Classification Search

CPC .......... F05D 2260/963; F05D 2260/96; F23M 20/005; F23R 2900/00014; F23R 3/002

See application file for complete search history.

(56) References Cited

U.S. PATENT DOCUMENTS

| | | | | |
|---|---|---|---|---|
| 5,685,157 | A | 11/1997 | Pandalai et al. | |
| 6,164,058 | A | 12/2000 | Döbbeling et al. | |
| 6,464,489 | B1 * | 10/2002 | Gutmark | F02B 51/06 431/1 |
| 6,923,002 | B2 | 8/2005 | Crawley et al. | |
| 6,981,358 | B2 | 1/2006 | Bellucci et al. | |
| 7,013,634 | B2 * | 3/2006 | Pidcock | F23R 3/002 60/39.821 |

(Continued)

FOREIGN PATENT DOCUMENTS

| | | | |
|---|---|---|---|
| DE | 102005062284 | A1 | 1/2008 |
| EP | 0576717 | A1 | 1/1994 |

(Continued)

OTHER PUBLICATIONS

International Search Report and Written Opinion issued in connection with corresponding PCT Application No. PCT/US2017/29833 dated Jul. 10, 2017.

*Primary Examiner* — Jesse Bogue

(74) *Attorney, Agent, or Firm* — General Electric Company; Pamela Kachur

(57) ABSTRACT

An acoustic damping device is provided that includes a resonating tube defining a resonating cavity with a predetermined characteristic length and a tube end defining a cavity opening, as well as a case configured to reversibly secure the tube end in fluidic communication with a fluid volume enclosed by a liner. The cavity opening is connected with the resonating cavity. The case includes a vented ferrule adpressed over a perforated region of the liner. The vented ferrule defines a ferrule opening that is aligned with the perforated region of the liner and the cavity opening to form the fluidic communication between the fluid volume and the resonating cavity.

20 Claims, 5 Drawing Sheets

(56) References Cited

U.S. PATENT DOCUMENTS

| | | | | |
|---|---|---|---|---|
| 7,076,956 | B2 * | 7/2006 | Young | F23R 3/002 60/725 |
| 7,334,408 | B2 | 2/2008 | Bethke et al. | |
| 7,413,053 | B2 | 8/2008 | Wasif et al. | |
| 7,661,267 | B2 * | 2/2010 | Pollarolo | F23R 3/50 60/725 |
| 7,788,926 | B2 | 9/2010 | Johnson et al. | |
| 7,827,777 | B2 | 11/2010 | Eroglu et al. | |
| 7,857,094 | B2 * | 12/2010 | Macquisten | F23R 3/002 181/250 |
| 7,874,138 | B2 | 1/2011 | Rubio et al. | |
| 7,874,159 | B2 | 1/2011 | Gerendás et al. | |
| 8,127,546 | B2 | 3/2012 | Park | |
| 8,205,714 | B2 | 6/2012 | Schuermans et al. | |
| 8,272,224 | B2 | 9/2012 | Cihlar et al. | |
| 8,408,004 | B2 | 4/2013 | Davis, Jr. et al. | |
| 8,469,141 | B2 | 6/2013 | Wang et al. | |
| 8,490,744 | B2 | 7/2013 | Nakamura et al. | |
| 8,567,197 | B2 * | 10/2013 | Mueller | F23R 3/00 60/722 |
| 8,973,365 | B2 * | 3/2015 | Corr | F23R 3/002 181/207 |
| 9,003,800 | B2 | 4/2015 | Akamatsu et al. | |
| 9,988,958 | B2 * | 6/2018 | You | F23R 3/00 |
| 2009/0293481 | A1 | 12/2009 | Bethke | |
| 2011/0179795 | A1 | 7/2011 | Johnson et al. | |
| 2011/0179796 | A1 * | 7/2011 | Magni | F23R 3/00 60/725 |
| 2011/0265484 | A1 | 11/2011 | Huber et al. | |
| 2012/0006028 | A1 | 1/2012 | Lee et al. | |
| 2012/0167574 | A1 | 7/2012 | Uskert | |
| 2012/0260657 | A1 | 10/2012 | Eroglu et al. | |
| 2013/0008167 | A1 | 1/2013 | Akamatsu et al. | |
| 2013/0042627 | A1 | 2/2013 | Gerendas et al. | |
| 2013/0074471 | A1 | 3/2013 | Khan et al. | |
| 2013/0160453 | A1 | 6/2013 | Kimura et al. | |
| 2015/0113990 | A1 | 4/2015 | Eroglu | |
| 2016/0003162 | A1 * | 1/2016 | Beck | F23R 3/002 60/725 |

FOREIGN PATENT DOCUMENTS

| | | | |
|---|---|---|---|
| EP | 1 510 757 | A2 | 3/2005 |
| EP | 2417394 | A2 | 2/2012 |
| EP | 1703207 | B1 | 5/2012 |
| EP | 2446194 | A1 | 5/2012 |
| WO | 9956059 | A1 | 11/1999 |
| WO | 2010115980 | A2 | 10/2010 |
| WO | 2010149420 | A1 | 12/2010 |
| WO | 2011117533 | A2 | 9/2011 |
| WO | 2012093011 | A1 | 7/2012 |
| WO | 2013029981 | A1 | 3/2013 |
| WO | 2013083348 | A2 | 6/2013 |

* cited by examiner

HIGH FREQUENCY ACOUSTIC DAMPER FOR COMBUSTOR LINERS

BACKGROUND OF THE INVENTION

The present disclosure relates generally to turbomachinery, particularly to gas turbine engines, and more particularly, to an acoustic damping apparatus to control dynamic pressure pulses in a gas turbine engine combustor.

Acoustic pressure oscillations or pressure pulses may be generated in combustors of gas turbine engines as a consequence of normal operating conditions depending on fuel-air stoichiometry, total mass flow, and other operating conditions. Gas turbine combustors are increasingly operated using lean premixed combustion systems in which fuel and air are mixed homogeneously upstream of the flame reaction region to reduce oxides of nitrogen or nitrous oxides (NOx) emissions. The "lean" fuel-air ratio or the equivalence ratio at which these combustion systems operate maintains low flame temperatures to limit production of unwanted gaseous NOx emissions. However, operation of gas turbine combustors using lean premixed combustion systems is also associated with combustion instability that tends to create unacceptably high dynamic pressure oscillations in the combustor which can result in hardware damage and other operational problems. Pressure pulses resulting from combustion instability can have adverse effects on gas turbine engines, including mechanical and thermal fatigue to combustor hardware.

Aircraft engine derivative annular combustion systems that include relatively short and compact combustor designs are also vulnerable to the production of complex predominant acoustic pressure oscillation modes within the combustor. These complex acoustic pressure oscillation modes are characterized as having a circumferential mode coupled with standing axial oscillation modes between two reflecting surfaces. Each of the two reflecting surfaces is located at an end of the combustor corresponding to compressor outlet guide vanes (OGV) and a turbine nozzle inlet. The complex acoustic pressure oscillation modes create high dynamic pressure oscillations across the entire combustion system.

A number of existing approaches attempt to inhibit the development of unwanted pressure pulses during the operation of gas turbine engine have had limited success. Pressure pulses within a gas turbine engine combustor may be ameliorated by altering the operating conditions of the gas turbine engine, such as elevating combustion temperatures, which results in an undesirable elevation of NOx emissions. Other existing approaches make use of complex and potentially unreliable active control systems to dynamically control dynamic pressure pulses within a gas turbine engine combustor by producing cancellation pressure pulses in response to detected combustor pressure pulses detected by sensors installed within the combustor. Other existing approaches make use of passive pressure dampers such as holes perforating the liner of the combustor and/or detuning tubes positioned at various locations. However, passive pressure dampers are effective only specific fixed amplitudes and frequencies, rendering passive pressure dampers of limited use due to the varying amplitudes and frequencies of pressure pulses within a combustor. In addition, existing passive pressure damper designs project through openings formed through liner of the combustor, creating structurally vulnerable regions of high thermal stress.

BRIEF DESCRIPTION OF THE INVENTION

In one aspect, an acoustic damping device comprises: a resonating tube defining a resonating cavity with a predetermined characteristic length and a tube end defining a cavity opening, as well as a case configured to reversibly secure a tube end in fluidic communication with a fluid volume enclosed by a liner. The cavity opening is connected with the resonating cavity. The case includes a vented ferrule adpressed over a perforated region of the liner. The vented ferrule defines a ferrule opening. The perforated region of the liner, the ferrule opening, and the resonating cavity opening are aligned to form the fluidic communication between the fluid volume and the resonating cavity.

In a further aspect, a method of damping pressure fluctuations within a fluid volume enclosed by a liner includes forming a perforated region through the liner. The perforated region includes a plurality of openings between an outer surface of the liner to an inner surface of the liner adjacent the fluid volume. The method further includes coupling an acoustic damping device to the outer surface aligned with the perforated region. The acoustic damping device includes a case and a resonating tube. The resonating tube includes a resonating cavity formed of a predetermined characteristic length, and a first end defining a resonating cavity opening. The method further includes adpressing the case to the outer surface over the perforated region. The case includes a vented ferrule defining a ferrule opening. The method further includes coupling the first end to the case, with the perforated region, the ferrule opening, and the resonating cavity opening aligned to form a fluidic communication between the fluid volume and the resonating chamber.

In a further aspect, a gas turbine engine includes a combustor coupled in flow communication with a compressor that includes a combustor liner with at least one plurality of openings in a perforated region. The combustor liner encloses a combustion zone. The combustor also includes at least one acoustic damping device. Each acoustic damping device is attached over each corresponding plurality of openings of the at least one plurality of openings. Each of the acoustic damping devices includes a resonating tube defining a resonating cavity with a predetermined characteristic length. The resonating tube includes an open tube end. Each of the acoustic damping devices further includes a case configured to reversibly secure the open tube end in fluidic communication with the combustion region. The case includes a vented ferrule adpressed over one perforated region of the combustor liner. The vented ferrule defines a ferrule opening. The one perforated region of the liner, the ferrule opening, and the open tube end are aligned to form the fluidic communication between the combustion zone and the resonating chamber.

DETAILED DESCRIPTION OF THE INVENTION

It should be appreciated that the term "forward" is used throughout this application to refer to directions and positions located axially upstream towards a fuel/air intake side of a combustion system, for the ease of understanding. It should also be appreciated that the term “aft” is used throughout this application to refer to directions and positions located axially downstream toward an exit plane of a main swirler, for the ease of understanding. It should be further appreciated that the term “reversibly secure” is used throughout this application to refer to the action of securing a tube end within a case of an acoustic damping device using a reversible securing means including, but not limited to, a reversible mechanical fastener such as a threaded end and threaded receptacle, such that the tube end may be subsequently removed, for the ease of understanding.

Figure 1:
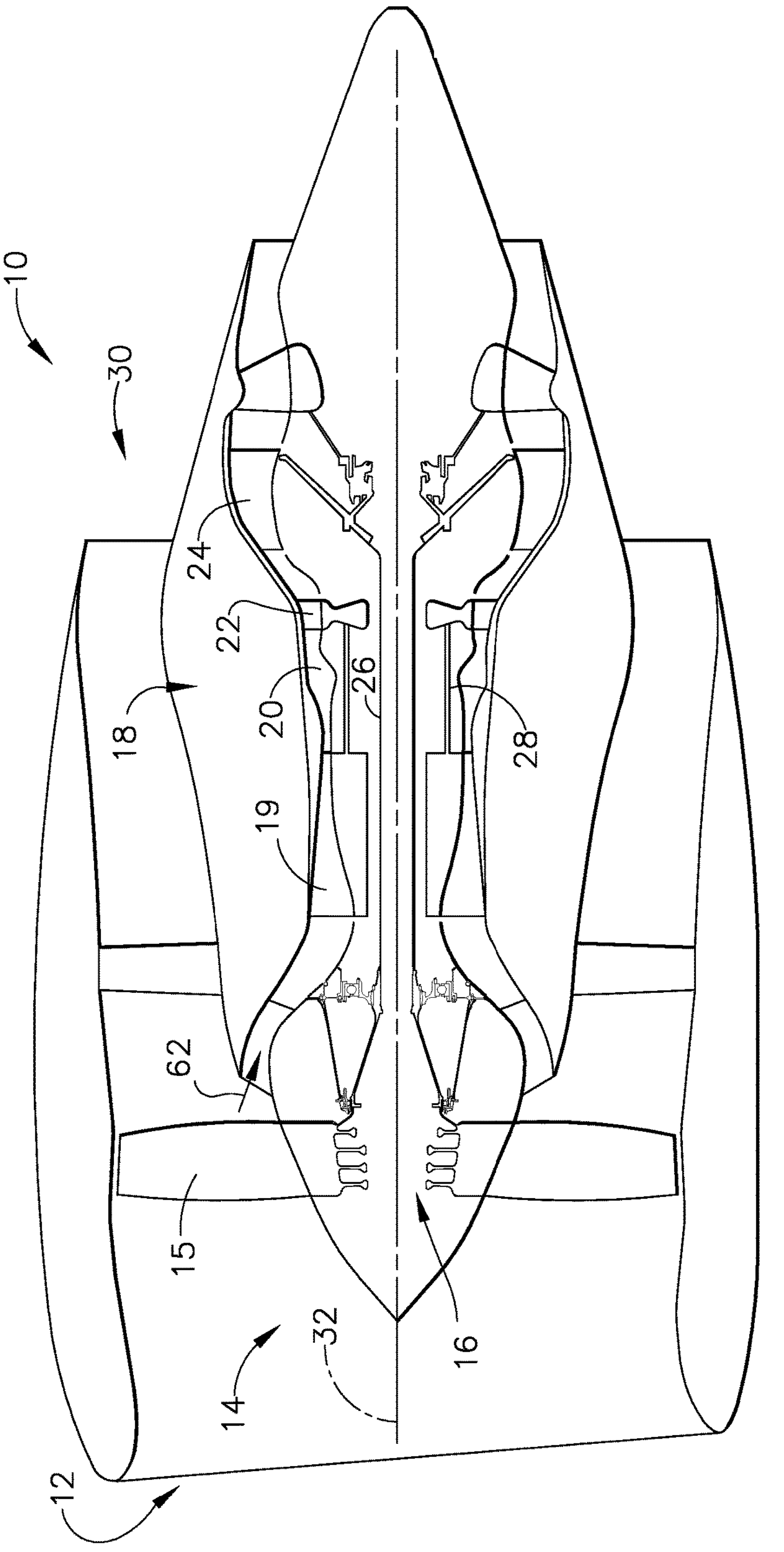
FIG. 1 is a schematic illustration of an exemplary gas turbine engine including a combustor.

FIG. 1 is a schematic illustration of exemplary gas turbine engine 10 including air intake side 12, fan assembly 14, core engine 18, low pressure turbine 24, and exhaust side 30. Fan assembly 14 includes an array of fan blades 15 extending radially outward from a rotor disc 16. Core engine 18 includes high pressure compressor 19, combustor 20, and high pressure turbine 22 in serial flow communication. Fan assembly 14 and low pressure turbine 24 are coupled by first rotor shaft 26, and high pressure compressor 19 and high pressure turbine 22 are coupled by second rotor shaft 28 such that fan assembly 14, high pressure compressor 19, high pressure turbine 22, and low pressure turbine 24 are in serial flow communication and co-axially aligned with respect to central rotational axis 32 of gas turbine engine 10.

During operation, air enters through air intake side 12 and flows through fan assembly 14 to high pressure compressor 19. Total airflow 62 is delivered to combustor 20. Airflow from combustor 20 drives high pressure turbine 22 and low pressure turbine 24 prior to exiting gas turbine engine 10 through exhaust side 30.

Figure 2:
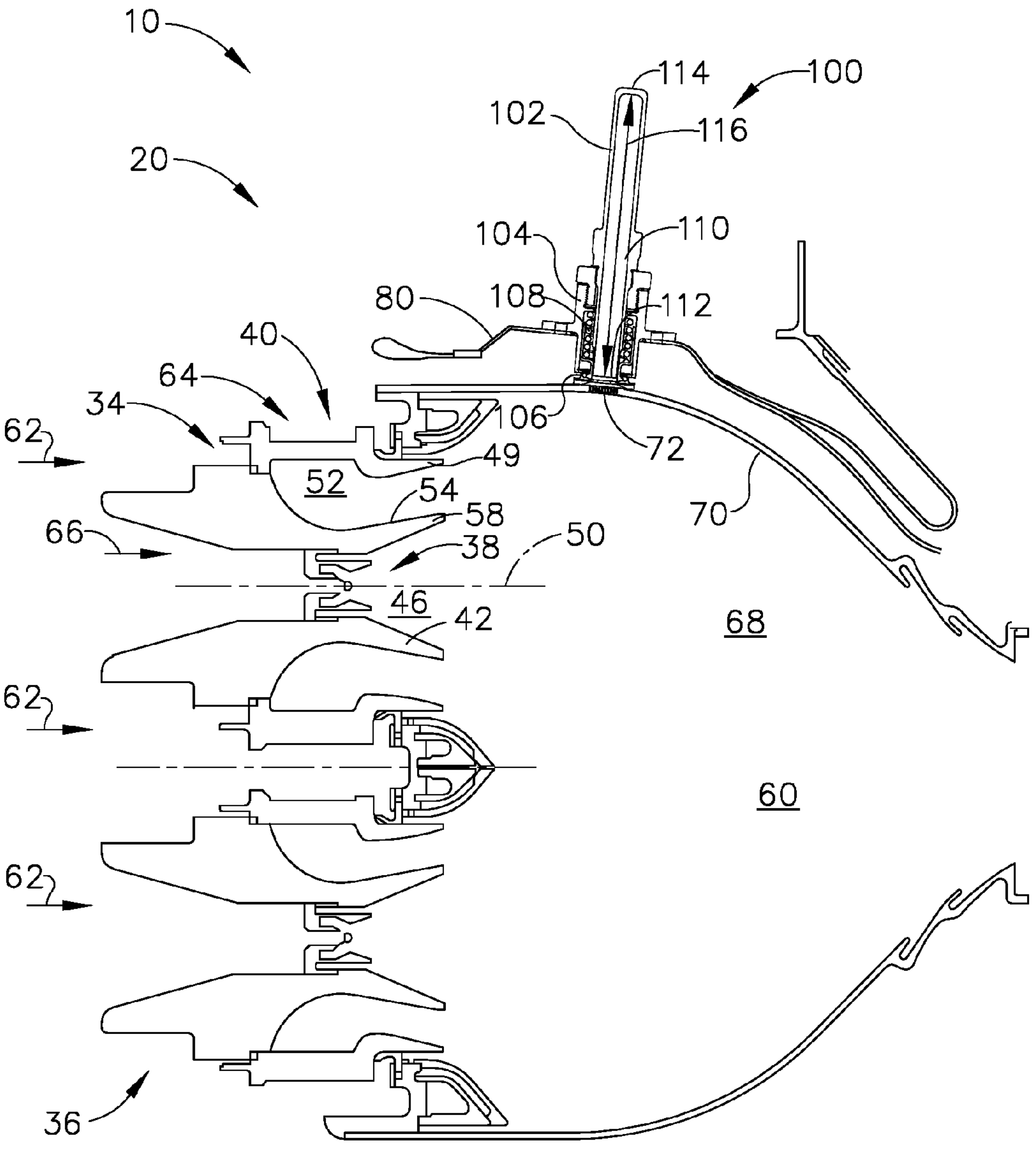
FIG. 2 is a schematic cross-sectional view of a combustor with an exemplary acoustic damper that may be used with the gas turbine engine shown in FIG. 1.

FIG. 2 is a schematic cross-sectional view of combustor 20 that may be used with gas turbine engine 10 (shown in FIG. 1). Combustor 20 includes outer burner 34 and an inner burner 36. Each burner 34 and 36 includes pilot swirler 38, main swirler 40, and an annular centerbody 42. Annular centerbody 42 is positioned radially outward from pilot swirler 38 and extends circumferentially about pilot swirler 38, and defines a centerbody cavity 46.

In the exemplary embodiment, main swirler 40 includes an annular main swirler housing 49 that is spaced radially outward from pilot swirler 38 and centerbody 42, such that an annular main swirler cavity 52 is defined between housing 49 and radially outer surface 54 of centerbody 42. A fluid volume 68 containing a main swirler combustion zone 60 is defined downstream from main swirler 40 and pilot swirler 38. Fluid volume 68 and main swirler combustion zone 60 is defined is contained by an annular combustor liner 70.

During operation of combustor 20, the total airflow 62 is channeled to combustor 20 from high pressure compressor 19. In the exemplary embodiment, main swirler airflow 64 is channeled towards main swirler 40 and pilot airflow 66 is delivered to pilot swirler 38. Main airflow 64 enters main swirler 40 and mixes with main fuel (not shown) supplied to main swirler 40 via a main swirler manifold (not shown). Specifically, in the exemplary embodiment, fuel and air are pre-mixed in main swirler 40 before the resulting pre-mixed fuel-air mixture is channeled through main swirler cavity 52 into main swirler combustion zone 60. More specifically, main swirler 40 facilitates providing a lean, well-dispersed fuel-air mixture to combustor 20 that facilitates reducing NOx and carbon monoxide (CO) emissions from engine 10. The fuel-air mixture is supplied to main swirler combustion zone 60 via main swirler cavity 52 wherein combustion occurs.

Combustor 20 has naturally occurring acoustic frequencies that may be experienced during operation of engine 10. For example, when operated under lean conditions, high frequency combustion dynamics can be produced in combustor 20. The high frequency acoustics, or combustion instabilities, in dry low emission (DLE) combustors, such as combustor 20, are associated with an interaction of an unstable flame in combustor 20 with vortex shedding at centerbody trailing end 58. Vortex shedding involves the formation of non-continuous vortices extending downstream from trailing end 58. Vortex shedding may cause oscillations in the fuel-air mixture and in the heat released from the lean premixed flame. Moreover, such vortices may couple with the acoustics in combustor 20. When such coupling occurs, high combustion instability magnitudes may result that can produce unwanted vibrations.

The inclusion of pilot swirler 38 within combustor 20 may reduce $NO_x$ and CO emissions and may further facilitate reducing combustion instabilities. Specifically, main swirler 40 facilitates providing a lean fuel-air mixture by pre-mixing fuel with main swirler airflow 64. The resulting main swirler flame has a lower temperature than a non-lean flame and may reduce NOx emissions produced during combustion. The low flame temperature, however, facilitates increasing combustion instabilities of combustor 20. In the exemplary embodiment, pilot swirler 38 may help suppress the combustion instabilities of combustor 20 by providing a non-lean and non-pre-mixed fuel-air mixture using a fraction of the total fuel flow supplied to combustor 20. More specifically, the pilot flame generates a highly viscous hot gaseous flow that suppresses the vortices which cause combustion instability. The pilot flame within the combustor 20 is sustained using a fraction of the total fuel flow to combustor 20. By way of non-limiting example the pilot flame may consume about 2% of the total fuel flow to combustor 20.

In one embodiment, combustor 20 includes at least one acoustic damping device 100 to dampen various modes of combustion dynamics produced within combustor 20 including, but not limited to, transverse, axial, and combined axial-transverse acoustic modes that may occur in a rich-burn or lean-burn aero or aero-derivative combustor. Device 100 includes resonating tube 102 enclosing an open-ended resonating cavity 110 secured within case 104 that maintains proximal open end 112, which defines resonating cavity opening 113 (see FIG. 3), adpressed against a perforated region 72 of combustor liner 70. In one embodiment, open end 112 is maintained adpressed against perforated region 72 by bias member 108 provided within case 104. Bias member 108, including, but not limited to, a biasing spring produces a biasing force that maintains the position of proximal open end 112 against perforated region 72 throughout a range of positions of combustor liner 70, which may deflect due to thermal stresses and/or different thermal expansion/contraction relative to adjoining structural elements including, but not limited to, elements of device 100.

At least a portion of the acoustic energy within combustion zone 60 associated with various combustion dynamics modes is transferred to resonating cavity 110 via a fluid pathway formed through perforated region 72 of liner 70 and open end 112 of resonating tube 102. This fluid pathway is maintained without significant leakage during various operating conditions of engine 10 due to the seal between device 100 and combustor liner 70 maintained by the adpressed open end 112 of resonating tube 102.

The acoustic energy transferred to resonating cavity 110 is at least partially absorbed by device 100, thereby suppressing the amplitude and/or changing the mode shape characterizing the acoustic energy within the combustion zone 60 and resulting in the reduction of combustion dynamics. In one embodiment, resonating cavity 110 is a quarter-wave resonator enclosed by resonating tube 102. Resonating tube 102 comprises open proximal end 112 and closed distal end 114 separated by characteristic length 116. Without being limited to any particular theory, acoustic energy from combustion zone 60 entering open end 112 in the form of acoustic waves propagate distally to closed end 114, which reflects the acoustic waves back toward proximal open end 112 at a phase 180 degrees out of phase with subsequent incoming acoustic waves entering open end 112 from combustion zone 60. The oscillation of air within resonating cavity 110 at a range of frequencies associated with characteristic length 116 creates dissipative losses including, but not limited to, viscous and eddy losses which enable dissipation of the acoustic energy. The acoustic energy contained in the acoustic waves entering open end 112 from combustion zone 60 is attenuated resulting in reduced combustion dynamics within combustion zone 60.

In various embodiments, device 100 attenuates a portion of the acoustic energy within combustion zone 60 failing within a frequency range determined by characteristic length 116 of device 100. Accordingly, the characteristic length 116 of device 100 is selected to attenuate a desired range of acoustic energy frequencies. In one aspect, characteristic length 116 of resonating tube 102 corresponding to the desired frequency range to be attenuated is selected using semi-empirical methods well known in the art. The frequency range of acoustic energy to be attenuated is typically determined using a combination of past experience, empirical and semi-empirical modeling, and by trial and error. By way of non-limiting example, characteristic length 116 suitable for attenuating acoustic energy characterized by a frequency f is selected according to Eqn. 1:

$$L = \frac{C}{4f} \tag{1}$$

in which L is characteristic length 116, C is the speed of sound at selected temperature and pressure, and f is the frequency of acoustic energy to be attenuated.

In various aspects, device 100 may attenuate the acoustic energy of combustion dynamics at a frequency ranging from about 100 Hz to about 5000 Hz. To attenuate the acoustic energy of combustion dynamics at this frequency range, characteristic length 116 of device 100 ranges from about 1 inch (2.5 cm) to about 15 inches (38 cm). In one aspect, combustor 20 may include two or more devices 100 to enhance the attenuation of combustion dynamics. Two or more devices 100 may be positioned at different locations on combustor liner 70 according to the distribution of frequencies and or spatial distribution of combustion dynamics within combustion zone 60.

In one embodiment, the two or more devices 100 are circumferentially distributed around annular combustor liner 70 at similar streamwise locations relative to combustion zone 60. In another embodiment, the two or more devices 100 are axially distributed along length of combustor liner 70 at different streamwise locations relative to combustion zone 60. In an additional embodiment, the two or more devices 100 are both circumferentially and axially distributed on combustor liner 70. In another additional embodiment, additional devices are positioned upstream of burners 34 and 36 to attenuate upstream-propagating combustion dynamics.

In various embodiments, one, two, three, four, five, six, seven, eight, nine, ten, eleven, twelve, fifteen, twenty, or more devices 100 are installed on combustor liner 70 and/or forward of burners 34 and 36. In one embodiment, all devices 100 include resonating tubes 102 with matched characteristic lengths 116 so that all devices 100 attenuate combustion dynamics in a matched frequency range. In another aspect, all devices 100 include resonating tubes 102 with different characteristic lengths 116 so that the devices 100 attenuate combustion dynamics within a variety of frequency ranges according to the distribution of characteristic lengths 116 among the two or more devices 100.

Figure 3:
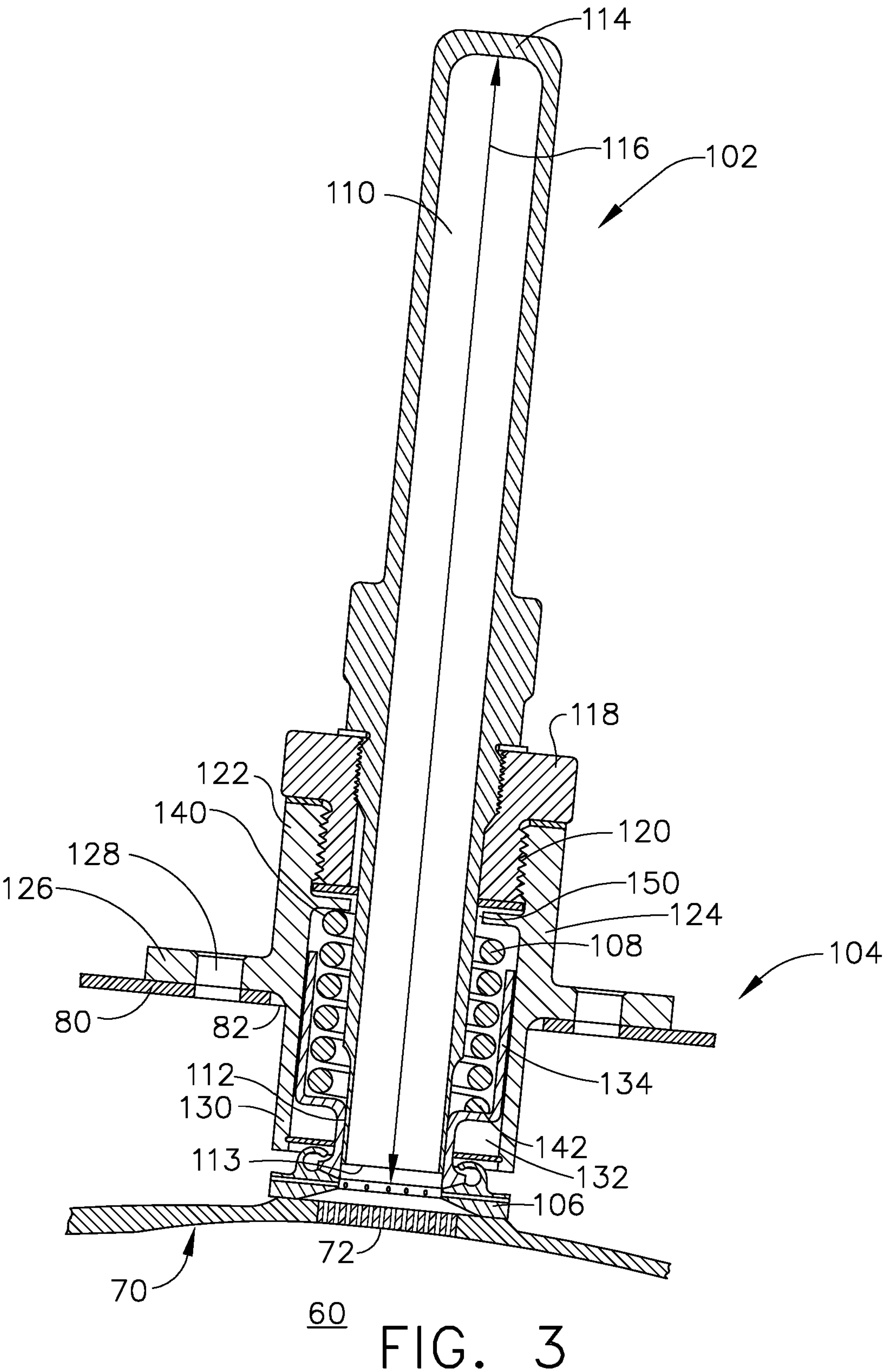
FIG. 3 is a schematic cross-sectional view of the exemplary acoustic damper shown in FIG. 2.

FIG. 3 is a detailed cross-sectional schematic view of device 100 illustrated in FIG. 2. In the exemplary embodiment illustrated in FIG. 3, device 100 includes resonating tube 102 secured within case 104 by engaging fastener portion 118 of resonating tube 102 to fastener fitting 120 formed within distal end 122 of case 104. In various aspects, fastener portion 118 is affixed to resonating tube 102 between proximal open end 112 and distal closed end 114 at a position selected to situate open end 112 adpressed against perforated portion 72 of combustor liner 70. In various other aspects, fastener portion 118 is configured to retain a portion of resonating tube 102 in a fixed position relative to case 104 by any known means of retaining tubes within attachment fittings including, but not limited to, friction fittings, clamps, set screws, compression fittings, and any other known retention fitting.

In this embodiment, the fastener portion 118 of resonating tube 102 is configured to reversibly engage fastener fitting 120, thereby enabling resonating tube 102 to be replaced by a resonating tube 102 with a different characteristic lengths 116 with minimal disruption to elements of combustor 20 including, but not limited to, combustor casing 80 and/or combustor liner 70. In an embodiment, resonating tube 102 is selected from a plurality of resonating tubes 102 with different characteristic lengths 116 according to need. For example, the relative ease of replacement of resonating tubes 102 in acoustic damping device 100 enables the fine-tuning of damping of combustion dynamics at frequency ranges corresponding to the characteristic length 116 of the resonating tube 102.

Referring again to FIG. 3, case 104 further includes affixed base portion 124 attached to combustor outer casing 80 in this embodiment. Base portion 124 includes attachment fitting 126 configured to attach to outer casing 80. Attachment fitting 126 includes at least one fastener opening 128 configured to receive a mechanical fastener therethrough and into underlying outer casing 80 to affix base portion 124 to outer casing 80 of combustor 20. Non-limiting examples of suitable mechanical fasteners include screws, bolts, rivets, or any other suitable mechanical fasteners.

Figure 4:
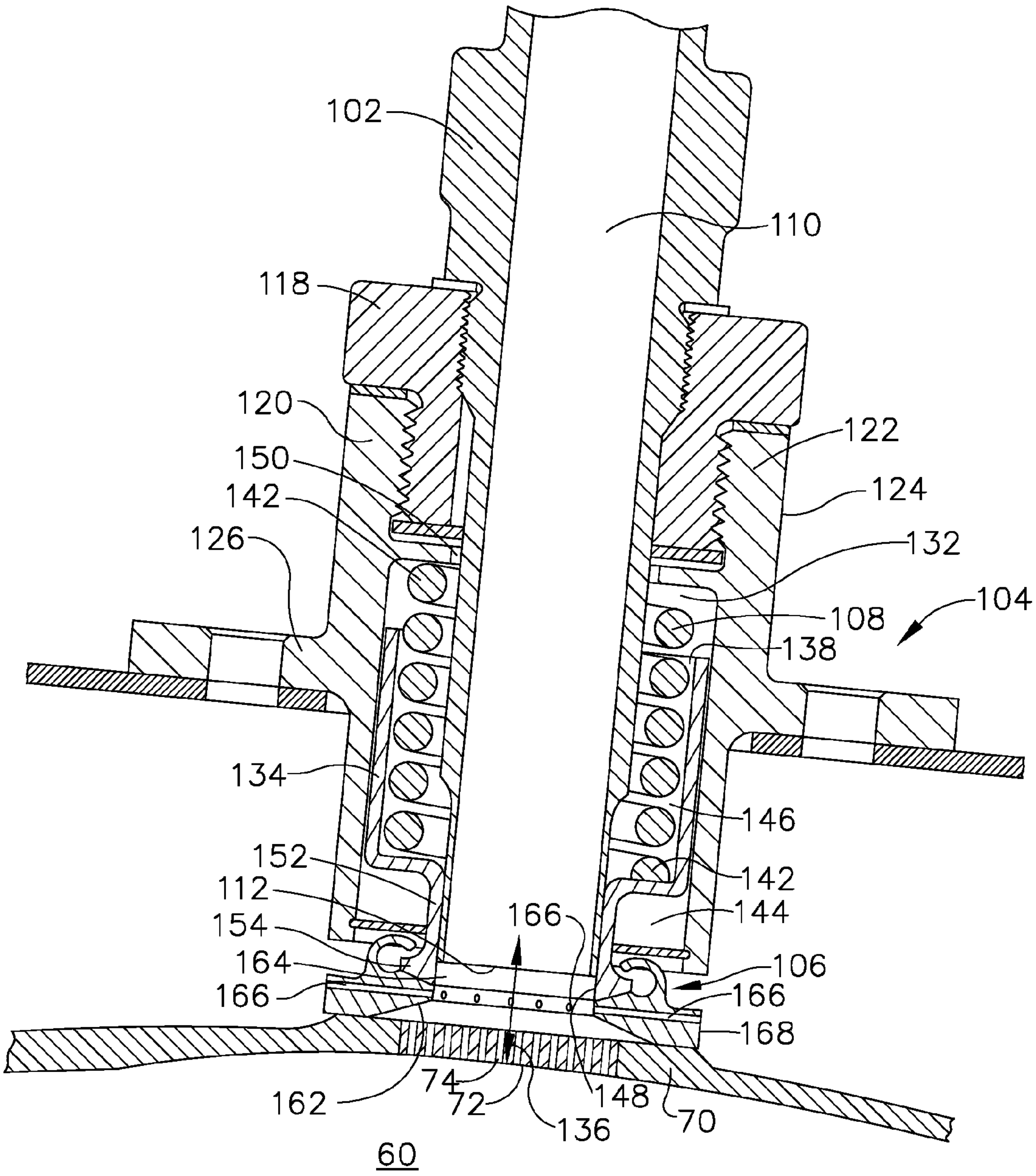
FIG. 4 is a schematic cross-sectional view of the attached end of the exemplary acoustic damper shown in FIG. 2 and FIG. 3 attached to a combustor liner.

As illustrated in FIG. 3, proximal end 130 of base portion 124 protrudes through opening 82 defined through outer casing 80 of combustor 20. Proximal end 130 defines sleeve track 132 containing sleeve 134. FIG. 4 is a closer view of case 104 illustrated in FIGS. 2 and 3. Referring to FIGS. 3 and 4, sleeve 134 is configured to slide in proximal-distal direction 136 under the influence of bias member 108 contained within sleeve lumen 138 formed within sleeve 134. Bias member 108 is attached at spring distal end 140 to inner surface 144 of sleeve track 132 and at opposed spring proximal end 142 to inner surface 146 of sleeve lumen 138.

In this embodiment, bias member 108 is preloaded such that sleeve proximal end 148 and attached ferrule 106 protrude proximally and adpress ferrule 106 against perforated region 72 of combustor liner 70.

Referring again to FIGS. 3 and 4, base portion 124 of case 104 receives proximal open end 112 of resonating tube 102 through case opening 150 between fastener fitting 120 and sleeve track 132. Proximal open end 112 extends proximally through sleeve lumen 138 and bias member 108 and is mechanically retained against tube retention fitting 152 formed within sleeve lumen 138 at sleeve proximal end 148. By way of non-limiting example, tube retention fitting 152 may be a circumferential step formed at sleeve proximal end 148 as illustrated in FIGS. 3 and 4.

Figure 5:
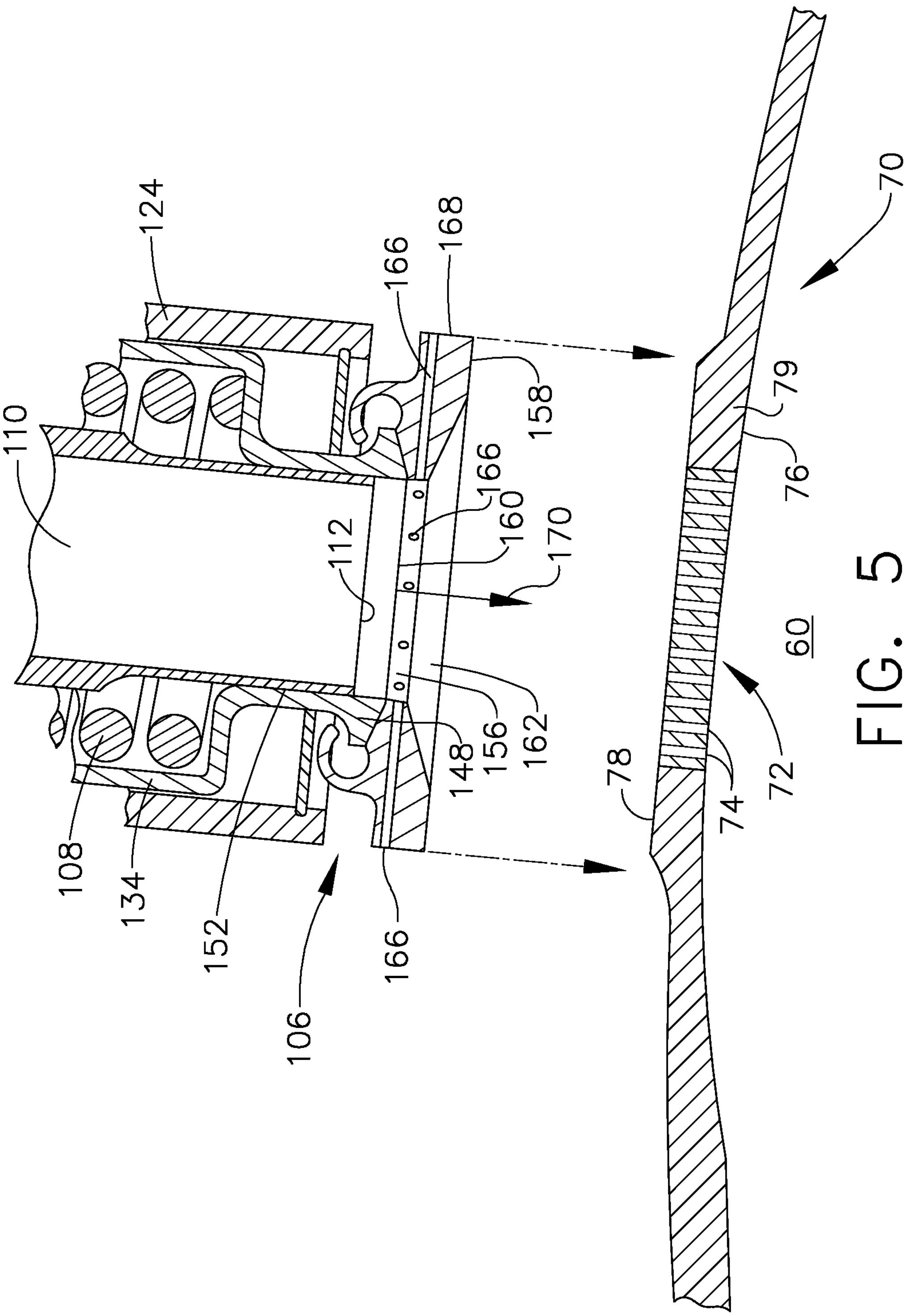
FIG. 5 is an exploded schematic cross-sectional view of the attached end of the exemplary acoustic damper shown in FIG. 4.

In this embodiment, ventilated ferrule 106 is attached to sleeve proximal end 148. FIG. 5 is an exploded view of ferrule 106 and combustor liner 70 illustrated in FIGS. 2, 3, and 4. As illustrated in FIG. 5, ferrule 106 is attached to sleeve proximal end 148. Ferrule 108 includes a central ferrule opening 156 passing from ferrule proximal face 158 to ferrule distal face 160. In one aspect, central ferrule opening 156 includes flared opening portion 162 formed in ferrule proximal face 158. In this aspect, flared opening portion 162 is sized to overlap at least a portion of openings 74 formed through combustor liner 70 at perforated portion 72 (see FIG. 4). Proximal ferrule face 158 is sized to cover all openings 74 within perforated region 72 to direct pressure fluctuations resulting from combustion dynamics from combustion zone 60 into resonating chamber 110 via openings 74, ferrule opening 156, proximal sleeve opening 164, and proximal open end 112 of resonating tube 102.

Referring again to FIGS. 4 and 5, ferrule 106 further includes a plurality of ferrule channels 166 forming a plurality of air conduits extending radially from ferrule opening 156 to outer edge 168 of ferrule 106. In this embodiment, ferrule channels 166 facilitate damping of pressure fluctuations from combustion zone 60 entering acoustic damping device 100. In various embodiments, ferrule channels 166 extend in radial directions and at any upward or downward angle with respect to the plane of ferrule proximal face 158 without limitation. In various embodiments, plurality of ferrule channels 166 include at least 2 channels, at least 3 channels, at least 4 channels, at least 5 channels, at least 6 channels, at least 7 channels, at least 8 channels, at least 10 channels, at least 12 channels, at least 16 channels, at least 24 channels, or more channels.

Referring again to FIG. 5, bias member 108 exerts a proximal bias force 170 configured to adpress ferrule proximal face 158 against outer surface 78 of combustor liner 70 over openings 74 of perforated region 72 within combustor liner 70. Adpressed ferrule proximal face 158 forms a seal over openings 74 that is maintained by bias force 170. As illustrated in FIG, 4, ferrule 106 and attached sleeve 134 are configured to slide proximally and distally to compensate for expansions and contractions of combustor liner 70, while proximal face 158 remains sealed against outer surface 78 of liner 70 by bias force 170, as illustrated in FIG. 5.

Referring again to FIG. 5, combustor liner 70 includes a plurality of perforated regions 72, each perforated region 72 corresponding to each acoustic damping device 100. Each perforated region 72 includes a plurality of openings 74 extending from inner surface 76 of liner 70 adjacent to combustion zone 60, to outer surface 78 of liner 70. In various embodiments, the plurality of openings 74 include from about 10 openings to about 30 openings or more. In various other aspects, the plurality of openings 74 include 10 openings, 12 openings, 14 openings, 16 openings, 18 openings, 20 openings, 22 openings, 24 openings, 26 openings, 28 openings, or 30 openings.

In various embodiments, each opening 74 may range in diameter from about 20 mm to about 60 mm. In various other embodiments, opening 74 may have a diameter of 20 mm, 22 mm, 24 mm, 28 mm, 32 mm, 36 mm, 40 mm, 44 mm, 48 mm, 52 mm, 56 mm, and 60 mm. In one embodiment, each of the openings 74 is matched in diameter. In another embodiment, one or more of the openings 74 have a different diameter than other openings 74 within perforated region 72.

In various embodiments, plurality of openings 74 may be aligned at any angle relative to combustor liner 70 without limitation. In one embodiment, plurality of openings 74 is locally perpendicular to combustor liner 70. In another embodiment, plurality of openings 74 is aligned at one or more angles relative to combustor liner 70. In one embodiment, all openings 74 are aligned along the same angle relative to combustor liner 70. By way of non-limiting example, openings 74 may be aligned perpendicularly to combustor liner 70, as illustrated in FIGS. 4 and 5. In another embodiment, plurality of openings 74 may have different angles with respect to one another and relative to combustor liner 70 within perforated region 72. In one embodiment, combustor liner 70 may include a locally thickened region or boss 79 to locally strengthen liner 70 adjoining each device 100.

In one embodiment, the area covered by each adpressed ferrule proximal face 158 is greater than the corresponding area of the perforated region 72 underlying ferrule proximal face 158. In one embodiment, flared opening portion 162 is dimensioned to expose at least a portion of underlying openings 74 of perforated region 72. In this embodiment, the contact area of flared opening portion 162 may be increased or decreased to modulate the combined area of exposed openings 74 through which pressure fluctuations may pass from combustion zone 60 into resonating cavity 110. In another embodiment, resonating tube 102 with proximal open end 112 may be replaced with a tube with a closed proximal end (not shown) to deactivate acoustic damping device 100 at that location on combustor liner 70. As described above, case 104 of acoustic damping device 100 is configured to reversibly secure different resonating tubes 102 with different characteristic lengths 116, thereby enabling swapping out resonating tube 102 for the tube with the closed proximal end or vice-versa with no necessary modification to remainder of acoustic damping device 100.

In this embodiment, the arrangement of ferrule 106 adpressed against perforated region 72 of combustor liner 70 affords at least several advantages over existing devices. The perforated region 72 that contains a plurality of relatively small openings 74 is relatively resistant to thermal stresses compared to the single large opening through which the resonating tube protrudes in existing acoustic damper designs. Further, the plurality of openings 74 may be scaled to a relatively larger overall damping area compared to the single opening required by existing designs with minimal impact on structural integrity of liner 70. In addition, the ability to deactivate and/or tune the frequency range of acoustic oscillations damped by an array of devices 100 via switching out resonating tubes 102 enables considerable flexibility in the ability to locally tune each device 100 of the array according to position on combustor liner 70.

In addition, the ability of acoustic damping device 100 to compensate for relative expansion or contraction of combustor liner 70 enables the use of a variety of materials for the construction of liner 70, as the liner material need not be matched to acoustic damping device 100 to reduce potential thermal stresses. Non-limiting examples of suitable materials for combustor liner 70 include heat resistant metals such as stainless steel and ceramic matrix composites (CMCs). In addition, acoustic damping device 100 minimizes the occurrence of large gaps in the juncture between acoustic damping device 100 and liner 70 due to the adpressing of ferrule 106 against liner 70, as well as the venting of ferrule 106 via relatively small ferrule channels 166.

Exemplary embodiments of acoustic damping devices are described in detail above. The acoustic damping device is not limited to use with the combustor described herein, but rather, the acoustic damping device can be utilized independently and separately from other combustor components described herein. Moreover, the invention is not limited to the embodiments of the combustor acoustic damping devices described above in detail. Rather, other variations of the combustor acoustic damping devices may be utilized within the spirit and scope of the claims.

While the invention has been described in terms of various specific embodiments, those skilled in the art will recognize that the invention can be practiced with modification within the spirit and scope of the claims.

What is claimed is:

1. An acoustic damping device comprising:

a resonating tube defining a resonating cavity with a predetermined characteristic length, and a tube end defining a cavity opening, said cavity opening connected with said resonating cavity; and a case configured to reversibly secure said tube end in fluidic communication with a fluid volume enclosed by a liner, said case comprising a vented ferrule adpressed over a perforated region of said liner, said vented ferrule defining a ferrule opening, wherein said perforated region of said liner, said ferrule opening, and said cavity opening are aligned to form said fluidic communication between said fluid volume and said resonating cavity.

2. An acoustic damping device in accordance with claim 1, wherein said resonating tube is selected from a plurality of interchangeable resonating tubes with different predetermined characteristic lengths.

3. An acoustic damping device according to claim 2, wherein said plurality of interchangeable resonating tubes comprise predetermined characteristic lengths ranging from about 2.5 cm to about 38 cm.

4. An acoustic damping device according to claim 1, wherein said case further comprises a bias member coupled to said vented ferrule, said bias member configured to maintain said vented ferrule adpressed over said perforated region.

5. An acoustic damping device according to claim 1, wherein said case further comprises a fastener fitting configured to reversibly couple to a corresponding fastener portion of said resonating tube to reversibly secure said cavity opening of said tube end in fluidic communication with said fluid volume enclosed by said liner.

6. An acoustic damping device according to claim 1, wherein said vented ferrule opening flares from a first radius adjacent to said cavity opening to a second radius adjacent to said perforated region, said second radius being larger than said first radius.

7. An acoustic damping device according to claim 1, wherein said perforated region comprises a plurality of openings, said plurality of openings comprise from about 10 openings to about 30 openings, each said opening comprising an opening radius ranging from about 20 mm to about 60 mm.

8. A method of damping pressure fluctuations within a fluid volume enclosed by a liner, the method comprising:

forming a perforated region through the liner, the perforated region comprising a plurality of openings between an outer surface of the liner and an inner surface of the liner adjacent the fluid volume;

coupling an acoustic damping device to the outer surface aligned with the perforated region, the acoustic damping device comprising a case and a resonating tube including a resonating cavity formed of a predetermined characteristic length and a first end defining a cavity opening;

adpressing the case to the outer surface over the perforated region, the case comprising a vented ferrule defining a ferrule opening; and coupling the first end to the case, with the perforated region, the ferrule opening, and the cavity opening aligned to form a fluidic communication between the fluid volume and the resonating chamber.

9. A method in accordance with claim 8, further comprising selecting the resonating tube from a plurality of interchangeable resonating tubes, each of the plurality of interchangeable resonating tubes having different predetermined characteristic lengths ranging from about 2.5 cm to about 38 cm.

10. A method in accordance with claim 9, wherein selecting the interchangeable resonating tube from the plurality of interchangeable resonating tubes further comprises selecting the interchangeable resonating tube having the predetermined characteristic length that approximately equals a quarter wavelength of the pressure fluctuations within the fluid volume.

11. A method in accordance with claim 8, further comprising adjusting the damping of the pressure fluctuations within the fluid volume by:

decoupling the tube end from the case;

selecting a second resonating tube with a second characteristic length different from the corresponding characteristic length of the resonating tube; and coupling a second tube end of the second resonating tube to the case, wherein the second resonating tube is selected to match the second characteristic length to the quarter wavelength of the pressure fluctuations.

12. A method in accordance with claim 11, where adjusting the damping of the pressure fluctuations within the fluid volume further comprises:

forming at least one additional perforated region through the liner; and installing an additional acoustic damping device comprising an additional case and an additional resonating tube over each of the at least one additional perforated regions.

13. A method according to claim 12, wherein installing an additional acoustic damping device over each of the at least one additional perforated regions comprises coupling each additional tube end of each additional resonating tube to each additional case, wherein each additional resonating tube comprises an additional characteristic length matched to the characteristic length of the resonating tube or at least a portion of the additional resonating tubes comprises at least one additional characteristic length different from the characteristic length of the resonating tube.

14. A method according to claim 8, wherein forming the perforated region through the liner further comprises forming the plurality of openings comprising from about 10 openings to about 30 openings, each opening comprising an opening radius ranging from about 20 mm to about 60 mm.

15. A method according to claim 8, further comprising maintaining the vented ferrule adpressed against the perforated region with a bias member provided within the case of the acoustic damping device.

16. A method according to claim 8, wherein forming at least one additional perforated region through the liner further comprises forming the at least one additional perforated region distributed at a single streamwise position of the liner or distributed at multiple streamwise positions of the liner, wherein the liner encloses a fluid flow moving in a streamwise direction.

17. A gas turbine engine comprising a combustor coupled in flow communication with a compressor, said combustor comprising a combustor liner including at least one plurality of openings in a perforated region, said combustor liner enclosing a combustion zone, said combustor comprising at least one acoustic damping device, each said acoustic damping device attached over each corresponding plurality of openings of said at least one plurality of openings, each acoustic damping device comprising:

a resonating tube defining a resonating cavity with a predetermined characteristic length, said resonating tube comprising an open tube end; and a case configured to reversibly secure said open tube end in fluidic communication with said combustion region, said case comprising a vented ferrule adpressed over one perforated region of said combustor liner, said vented ferrule defining a ferrule opening, wherein said one perforated region of said liner, said ferrule opening, and said open tube end are aligned to form said fluidic communication between said combustion zone and said resonating chamber.

18. A gas turbine engine in accordance with claim 17, wherein each said resonating tube is selected from a plurality of interchangeable resonating tubes with different predetermined characteristic lengths, said plurality of interchangeable resonating tubes comprising predetermined characteristic lengths ranging from about 2.5 cm to about 38 cm.

19. A gas turbine engine according to claim 17, wherein said at least one acoustic damping device comprises two or more acoustic damping devices circumferentially distributed around said combustor liner at similar streamwise locations of said combustion zone.

20. A gas turbine engine according to claim 17, wherein said at least one acoustic damping device comprises two or more acoustic damping devices distributed at different streamwise locations of said combustion zone.

* * * * *